Oct. 25, 1938.  J. L. SHROYER  2,134,675
FRYING APPARATUS
Filed June 16, 1936  2 Sheets-Sheet 1
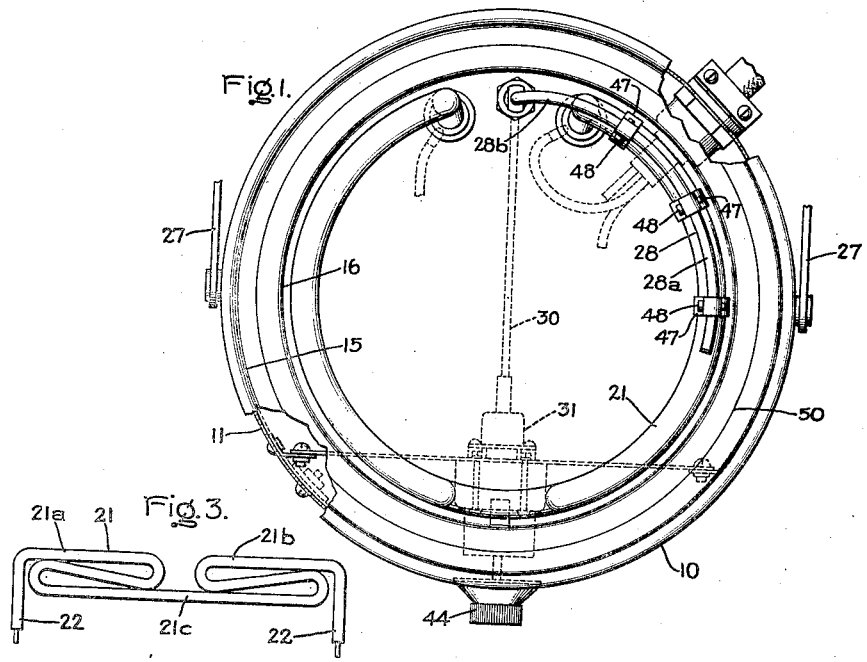
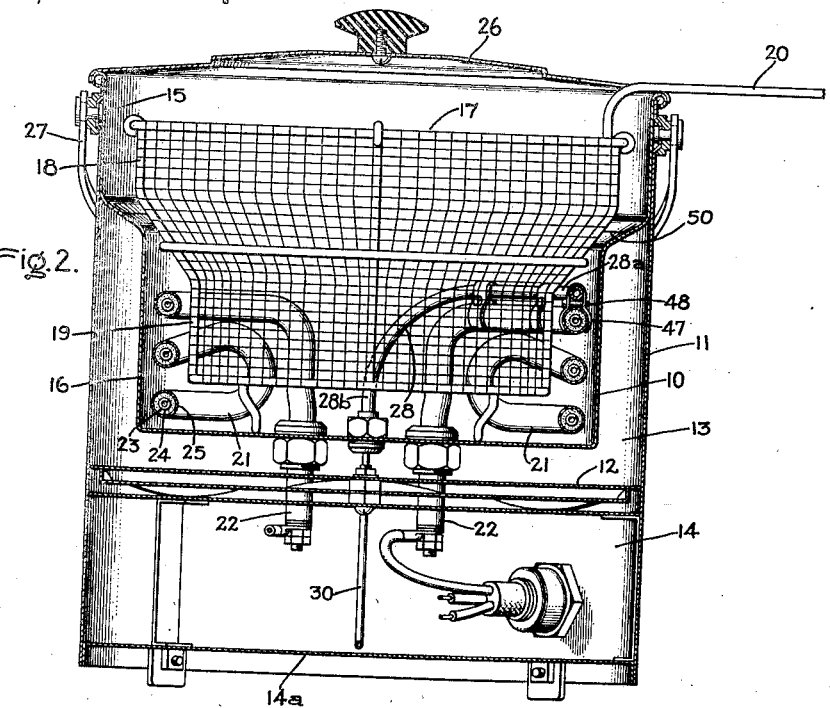
Inventor:
Jacob L. Shroyer,
by Harry E. Dunham
His Attorney.

Oct. 25, 1938.  J. L. SHROYER  2,134,675
FRYING APPARATUS
Filed June 16, 1936  2 Sheets-Sheet 2
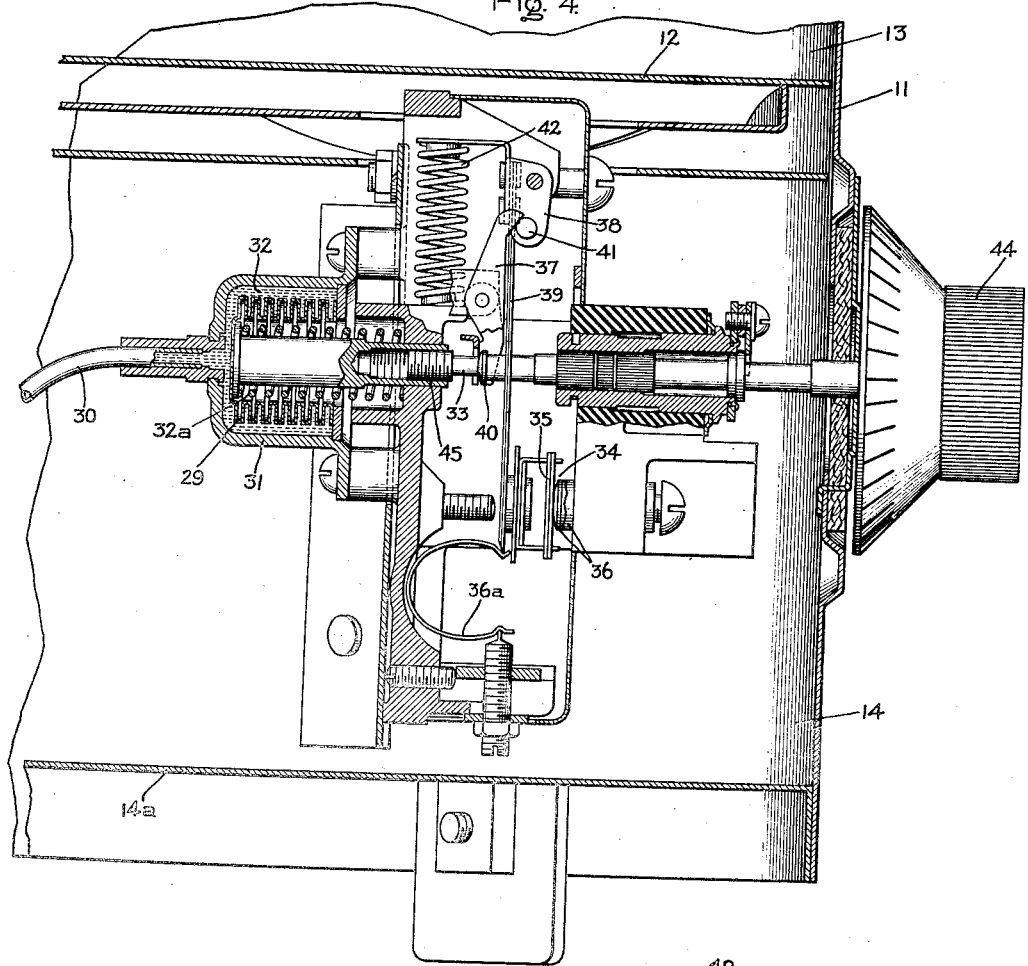
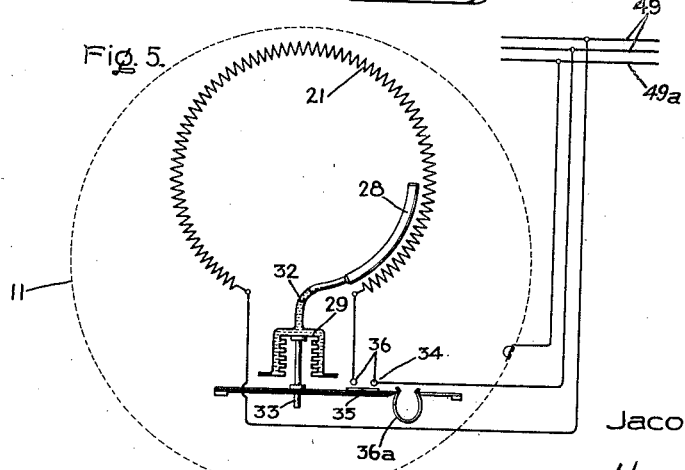
Inventor:
Jacob L. Shroyer,
by Harry E. Dunham
His Attorney.

Patented Oct. 25, 1938

2,134,675

UNITED STATES PATENT OFFICE 2,134,675

FRYING APPARATUS

Jacob L. Shroyer, Oak Park, Ill., assignor to Edison General Electric Appliance Company, Inc., Chicago, Ill., a corporation of New York Application June 16, 1936, Serial No. 85,497

9 Claims. (Cl. 219—43)

This invention relates to frying apparatus, more particularly to frying apparatus for use in the preparation of edibles, such as doughnuts, crullers, potatoes, meats, sea-foods, etc., and it has for its object the provision in apparatus of this character of improved means for controlling the temperature of the frying medium.

This invention has general application, but it is specifically applicable to my frying apparatus described and claimed in my United States Patent No. 1,990,351, dated February 5, 1935. This frying apparatus, as disclosed in my patent, is provided with a kettle for receiving the frying medium and the edibles to be cooked, and further, has immersion heating means in the kettle arranged to establish a frying medium of relatively high temperature in the upper portion of the kettle, while the frying medium in the lower portion of the kettle remains relatively cool.

This invention contemplates the provision of improved temperature responsive means controlling the heating means to maintain a predetermined temperature in the frying medium both when the medium has its normal liquid level in the kettle, and also, when the level falls materially below the normal level.

In accordance with this invention, in one form thereof, I provide a suitable temperature responsive element, which normally controls the heating means in accordance with the temperature of the frying region established in the upper portion of the kettle. The temperature responsive element, however, is arranged so that it also responds to the temperatures of the frying medium in the lower cooler regions of the kettle to control the heating means in accordance with these temperatures in the event the level of the frying medium falls materially below the normal frying level. In order to compensate for the loss of heat to the temperature responsive element normally supplied by the frying medium when at the normal high temperature level, I provide an auxiliary source of heat for the temperature responsive element. This auxiliary source supplies heat in quantities substantially to compensate for the loss of heat to the temperature responsive element by the falling of the frying medium.

In one form of my invention, I conveniently provide this auxiliary source of heat by thermally uniting the temperature responsive element with the heating means so that when the level of the medium falls, heat is imparted directly to the temperature responsive element from the heating means.

For a more complete understanding of this invention, reference should be had to the accompanying drawings in which Fig. 1 is a plan view of frying apparatus arranged in accordance with this invention, portions being broken away so as to illustrate certain details of construction; Fig. 2 is an elevation in section of the frying apparatus of Fig. 1; Fig. 3 illustrates an immersion heating element for heating the frying medium in the frying apparatus in Figs. 1 and 2, taken on a smaller scale; Fig. 4 is an enlarged fragmentary view in section of a portion of the frying apparatus of Figs. 1 and 2 illustrating a controlling element for the heating means of this frying apparatus; Fig. 5 is a diagrammatic representation of the heating element for the frying apparatus, together with control means therefor arranged in accordance with my invention.

Referring to the drawings, this invention has been shown in one form as applied to frying apparatus substantially as shown in my above patent. As shown, this apparatus comprises a kettle 10 adapted to receive the frying medium, such as a suitable grease, and also the edibles to be fried. The kettle 10 is mounted in the upper portion of an outer shell or casing 11, as clearly shown in Fig. 2. The casing 11 is provided with a wall 12 dividing the casing into two compartments 13 and 14, in the upper compartment of which the kettle 10 is located, and in the lower compartment of which suitable controlling apparatus is located, as will be pointed out in greater detail hereinafter. The lower compartment 14 is closed by a bottom wall 14a.

The kettle 10, as shown, is provided with an enlarged upper portion 15 and a lower portion 16 which is relatively smaller. Supported within the kettle is a suitable open-work basket 17 which is arranged to receive the edibles being fried. The basket 17, as shown, has a shape generally the same as the shape of the kettle 10. Thus, it is provided with an enlarged upper portion 18 and a smaller lower portion 19. The basket, however, is smaller than the kettle so that annular spaces are provided between its upper and lower portions 18 and 19 and the corresponding portions of the kettle, as clearly shown in Fig. 2. A suitable handle 20 is attached to the basket.

Arranged within the annular space between the lower smaller portions 16 and 19 of the kettle and basket is a suitable immersion heating element 21. This heating element, as shown in Fig. 1, extends substantially through the circumference of the annular space between the kettle and basket. The heating element 21, as shown, more clearly in Fig. 3, is divided into two branches of convolutions 21a and 21b joined by a substantially straight portion 21c. It will be understood, of course, that Fig. 3 illustrates the development of the heating element. The heating element is provided with terminal portions 22 which extend downwardly through apertures provided for them in the bottom wall of the kettle and in the wall 12 so as to project into the lower compartment 14 of the outer casing.

As pointed out in detail in my above mentioned patent, the heating element 21 is arranged above the walls of the kettle 10 and is spaced somewhat above its bottom wall so as to establish a frying region in the upper portion of the kettle above the heating element, the grease in this portion being heated to a relatively high frying temperature, such for example as 400° F. As also pointed out in detail, by reason of this arrangement of the heating element, the frying medium in the lower portion of the kettle remains comparatively cool so that a comparatively cool sediment well is provided in this portion of the kettle. The heat generation at the side walls of the kettle sets up a natural circulation in the frying medium, the grease at the side walls being heated and flowing upwardly, and thence downwardly as it cools through the central area embraced by the heating element 21 in a return path to the heating element at the sides.

The heating element 21 may be of any suitable immersion type, but I prefer to use the sheathed element described and claimed in the United States patent to C. C. Abbott, No. 1,367,341, dated February 1, 1921. As there described, this element comprises a coiled resistance element 23 embedded in a suitable heat conducting electrically insulating material 24, such as magnesium oxide, and enclosed in a metallic sheath 25. These heating elements can be easily bent or otherwise formed into the shape shown in Fig. 3.

The kettle is provided with a suitable manually removable cover 26 and a suitable bail 27.

The parts of the frying apparatus thus far described are substantially the same as the frying apparatus disclosed in my above mentioned patent, except that in this case the terminals for the heating element 22 extends downwardly into the lower compartment 14, rather than merely to a point below the bottom wall of the kettle, as in my patent.

My temperature controlling apparatus comprises a temperature responsive operating element, preferably of the bulb and bellows type. As shown, I provide a suitable bulb 28 in the kettle 10. The bulb 28 is operably associated with a suitable bellows 29 located in the compartment 14. The bulb 28 is connected with the bellows 29 by means of a capillary tube 30. The bellows 29, as shown, is mounted in a liquid-tight chamber 31. The chamber 31 as well as the capillary tube 30 and the bulb 28 are filled with a suitable thermal liquid 32 which contracts and expands as the bulb cools and heats. A loading spring 32a acting on the bellows opposes expansion of the liquid 32. The bellows 29 is connected to a suitable operating rod 33 which in turn is mechanically connected to operate a switch 34. The switch 34 comprises a bridging contact 35 which cooperates with a pair of fixed contacts 36. It will be understood that the contacts 36 will be electrically connected in the energizing circuit of the heating element 21, as shown diagrammatically in Fig. 5. Bearing on the free end of the arm 39 is a snap spring 36a.

The rod 33 controls the position of a lever 37 which in turn controls the position of a pivotally mounted support 38. This member 38 supports a flexible switch arm 39 which as shown supports and operates the bridging contact 35. The lower end of the lever 37, as viewed in Fig. 4, bears on a suitable abutment 40 mounted on the rod 33, while its opposite end bears upon a pin 41 mounted on the support 38. A compression spring 42 acts on the support 38 so as to bias the pin 41 against the adjacent end of the lever 37, and consequently to bias the opposite end of this lever against its stop 40 on the rod 33. It will be apparent in view of the foregoing description that the position of the switch arm 39 is controlled by the position of the lever 37 and that the position of this lever depends upon the position of rod 33. The position of this rod in turn is controlled by the position of the bellows 29 and this in turn is controlled by the temperature of the liquid 32.

The position of the rod 33, and hence of its abutment 40 relative to the switch operating mechanism, is also controlled by means of an adjusting knob 44. As shown, the rod 33 has a threaded connection 45 with the bellows so that when the knob 44 is adjusted the position of the abutment 40 is adjusted. This varies the temperature setting of the control device.

The switch operating arm 39 is of bimetallic structure so that it functions as a thermostat responsive to the ambient temperature in the compartment 14 to compensate for the effect of varying temperatures in this compartment on the action of the bellows 29.

The specific control device including the switch 34, its operating switch arm 39 and the parts associated with this switch arm, together with the specific arrangement of the bellows 29 and the operating rod 33 and its adjusting mechanism form no part of my invention, but constitute the subject matter of a copending application of Nicholas Miller and Russell A. Winborne, Serial No. 31,596, filed July 16, 1935, and which application is assigned to the same assignee as this invention.

The bulb 28, as shown, extends upwardly and outwardly from the bottom wall to define a substantially horizontal portion 28a lying directly above, but spaced from the upper convolutions of the heating element 21, and a second portion 28b that extends from the bottom wall upwardly to the horizontal portion 28a. The portion 28a, preferably and as shown, will be curved substantially on the same radius as is the associated convolutions of the heating element 21.

It will be observed that the portion 28a located above the heating element 21 lies directly in the path of the frying medium after it leaves the heating element in the course of the natural circulation of the frying medium. In other words, the portion 28a responds directly to the highly heated frying medium which establishes the high temperature frying region in the upper portion of the kettle above the heating element. The portion 28b responds to the temperatures of the cooler medium in the lower portion of the kettle. Normally, while all of the thermal liquid 32 in the bulb 28 functions to control the heating means 21, the portion 28a of the bulb in responding to the high temperature frying medium is the dominant element in the control, the effect of the portion 28b being relatively small during the normal operation.

However, if for any reason, the frying medium should fall sufficiently low to expose the portion 28a, the effect of this portion in controlling the heating means 21 in so far as it receives heat from the frying medium becomes less and less as the level of the medium falls, and that of the portion 28b becomes more and more important until it finally dominates the control when the portion 28a is completely exposed, again in so far as the bulb 28 receives heat from the frying medium. Under these conditions the bulb 28 does not accurately control the temperature of the frying medium, because of the loss of heat to the portion 28a due to the fall in the level of the frying medium. In other words, the average temperature of the bulb has been reduced by the loss of heat to the bulb portion 28a. To compensate for this loss of heat, I supply an auxiliary quantity of heat to the portion 28a. For this purpose, I provide suitable metallic heat conducting members 47 between the heating element 21 and the bulb portion 28a and spaced at intervals along this portion of the bulb. These members, as shown, may be in the form of clips which are secured to the bulb by screw fastening means 48. The clips 47 will have a low thermal mass so that when they are immersed in the normal operation of the apparatus, they will conduct substantially no heat from the heating element 21 to the bulb, but when exposed by a falling level in the frying medium will conduct sufficient heat to the bulb portion 28 to compensate for the heat lost due to the fall of the frying medium. The clips 47 may be and, as shown, are used not only to conduct heat to the bulb portion 28a, but also are used to mount the bulb 28 on the heating element, as clearly shown in Figs. 1 and 2.

It will be understood that the heating means 21 will be supplied from any suitable source of electrical supply. As shown, a suitable two wire alternating current source of supply 49 is provided for the heating element 21. One terminal of the heating element is permanently connected to one of these wires, while its other terminal is connected through the switch 34 to the other of the wires. A grounding wire 49a is connected to a wall of the kettle, as shown diagrammatically in Fig. 5.

In the operation of the frying apparatus, it will be understood that a suitable quantity of frying material, such as a suitable grease, will be placed in the kettle 10. Preferably the normal frying level of the grease will be at the level substantially midway between the ends of the shoulder which joins the lower portion 16 of the kettle with the upper large portion of the kettle, this level being indicated by the numeral 50 in Figs. 1 and 2. The heating element 21 is then energized through the switch 34 from the supply source 49 and heats the frying medium up to the temperature at which the control knob 44 is set, whereupon the thermal liquid 32 will have expanded sufficiently to cut off the heating element from the supply source by opening the switch 34. The frying medium will then begin to cool and upon its temperature falling to a predetermined low value, the liquid 32 will contract sufficiently to permit the switch to close to reapply the heat. In this manner, the temperature control holds a predetermined temperature in the frying medium between the maximum and minimum temperatures at which it cuts off and reapplies the heat. When edibles are placed in the basket 17 and the basket is inserted in the kettle, the temperature of the frying medium will be lowered somewhat, but the temperature control will function to restore the frying medium to the proper temperature and will hold this temperature.

Normally, as previously pointed out, the bulb portion 28a is the dominant element in the control of the heating element 21. However, if for any reason the level of the medium falls to such an extent that it begins to uncover the portion 28a, this portion no longer receives as much heat directly from the medium as it did when completely immersed. The farther the level falls and the larger the portion of the bulb portion 28a that becomes exposed, the less does this portion of the bulb respond to the temperature of the medium whose temperature is to be controlled. The portion 28b in so far as the response of the bulb 28 to the temperature of the frying medium is concerned becomes the dominating controlling portion and continues to function to effect a control of the heating element.

However, as the bulb portion 28a becomes exposed, heat is conducted directly to this portion from the heating element 21 through the metal clips 47. The metal clips are arranged to conduct sufficient heat directly to the bulb portion 28a so that this portion will operate as before in conjunction with the portion 28b to effect a proper control of the heating element to maintain the proper temperature in the frying medium. It will be understood that in the normal operation, when the bulb portion 28a is immersed, the clips 47, of course, also will be immersed and their temperature will be substantially the same as the frying medium covering them. Normally, therefore, the effect of the clips in conducting heat directly from the heating element 21 to the bulb is substantially negligible.

Thus, it will be observed that irrespective of the level of the frying medium in the kettle, my thermostatic device provides a sensitive control of the heating means 21 so as to maintain the desired temperature as set by the knob 44.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. Frying apparatus comprising a kettle adapted to contain a frying medium, heating means for said frying medium to establish a high temperature frying region in the upper portion of said kettle and a relatively cooler region below it, and control means for said heating means including a thermostatic element responsive to the temperatures of said frying medium at the upper frying region and also to those at the lower cooler region to control said heating means in accordance with the average temperature of the frying medium in said regions, and means for applying heat directly to the portion of the thermostatic element at the upper frying region when the frying medium falls below said region to compensate for the loss of heat to the thermostatic element due to the falling frying level.

2. In frying apparatus and the like having a kettle adapted to receive a frying medium and heating means for said frying medium, temperature control means for said heating means comprising a control element for said heating means, a temperature responsive bulb having a portion lying substantially in the upper frying region of said medium and another portion extending downwardly through the lower levels of said medium arranged to control the operation of said control element to hold a substantially constant temperature in said frying region, and auxiliary means for applying heat to said first-named portion of said bulb when said portion is exposed due to the falling level of said medium to compensate for the loss of heat to said portion due to the falling level whereby said bulb continues to function to control said heating means to hold substantially said temperature in said frying medium.

3. In frying apparatus and the like having a kettle adapted to contain a frying medium and heating means for said medium, temperature control means for said heating means including a thermostatic element lying substantially in the region of the normal frying level and having a portion extending down below said level to respond to the temperatures of the frying medium at said lower levels, a heat conducting member immersed in the frying medium at said normal frying level thermally uniting the portion of said thermostatic element lying in said level and said heating means, said heat conducting member having substantially the temperature of the frying medium at said level, and said member when the level of the frying medium falls conducting heat directly from the heating means to said portion substantially to compensate for the loss of heat to said thermostatic element due to the falling level of the frying medium.

4. In frying apparatus and the like having a kettle adapted to contain a frying medium and an immersion heater in said kettle, temperature control means for said heater comprising a temperature responsive bulb having a portion thereof lying in a predetermined level of said kettle above said heater and a second portion thereof extending below said level, said bulb being removed bodily from said heater, heat conducting members of relatively low thermal mass joining said first portion of said bulb with said heater, said bulb in its entirety normally being immersed in said frying medium, and the heat conducting members having substantially the temperatures of the frying medium at said predetermined level, but when the level of said medium falls below said predetermined level said members conduct heat directly from the heater to said first portion substantially to compensate for the loss of heat to said portion due to the falling level of said frying medium.

5. In frying apparatus and the like having a kettle adapted to contain a frying medium and an immersion heater in said kettle adjacent its side walls, temperature control means for said heater comprising a temperature responsive bulb, a portion of said bulb lying at a level adjacent to and above said heater in the path of the frying medium directly after it leaves said heater in the course of its natural circulation from said heater, and a second portion extending downwardly through the lower levels of said medium, metallic heat conducting strips of relatively low thermal mass interposed between said first portion and said heater, and having substantially the temperature of the medium at said level, said members when the frying level falls to uncover said first portion conducting heat directly from said heater to said first portion substantially to compensate for the loss of heat to said portion due to the falling level of the frying medium.

6. In frying apparatus and the like having a kettle adapted to contain a frying medium and immersion heating means in said kettle arranged to heat said medium to establish a frying medium of relatively high temperature in the upper portion of said kettle, while the medium in the lower portion of said kettle remains comparatively cool, a control system for said heating means comprising a temperature responsive bulb immersed in said frying medium having a portion at a level above said heating means and in the path of said medium directly after it leaves said heating means in the course of its natural circulation from said heating means, and a second portion extending downwardly from said level through the lower cooler regions of said medium, metallic supporting clips securing said first portion to said heating means having substantially the temperature of the frying medium at said level, but when the level of the frying medium falls to expose said first portion, heat is conducted to said first portion directly from said heating means through said heat conducting clips substantially to compensate for loss of heat to said portion by the fall of said medium.

7. In frying apparatus having a kettle adapted to contain a frying medium and a heating element within said kettle formed into a plurality of convolutions covering a substantial portion of the area of the side wall of said kettle, temperature control means for said heating means comprising a temperature responsive element having a portion arranged to respond to the temperature of the frying medium in said kettle substantially at the level of the top of said convolutions where the medium leaves said heating element in the course of its natural circulation, and further, having a second portion responsive to the lower temperatures of the frying medium in said kettle below said level, and auxiliary means for applying heat to said first portion when said frying medium falls below said level to compensate for the loss of heat to said portion by the medium when normally above said level.

8. In frying apparatus and the like having a grease kettle and an immersion heating element within said kettle arranged to apply heat to the frying medium in said kettle to establish a frying region of relatively high temperature in the upper portion of said kettle, while the frying medium in the lower portion of said kettle has comparatively low temperatures, a temperature control device for said heating means comprising a temperature responsive bulb having a relatively large portion lying substantially horizontally in said kettle at a level somewhat above said heating means in the path of the heated frying medium after it leaves said heating means in the course of its natural circulation, and a second portion extending downwardly through the cooler portions of said frying medium in the lower portion of said kettle and extending to the bottom wall of said kettle, heat conducting metallic members of relatively low thermal mass thermally connecting said first portion with said heating element and a controlling element for said heating element below said bottom wall comprising a switch controlling the energization of said heating element and an actuating member for said switch actuated responsively to the temperature of said bulb.

9. In frying apparatus and the like having a grease kettle and an immersion heating element within said kettle, a temperature control device for said heating means comprising a temperature responsive bulb having a relatively large portion lying substantially horizontally in said kettle at a level somewhat above said heating means, and a second portion extending downwardly through the cooler portions of said frying medium in the lower portion of said kettle and extending substantially to the bottom wall of said kettle, heat conducting members of relatively low thermal mass thermally connecting said first portion with said heating element and a controlling element for said heating element comprising a switch controlling the energization of said heating element and an actuating member for said switch actuated responsively to the temperature of said bulb.

JACOB L. SHROYER.

CERTIFICATE OF CORRECTION.

Patent No. 2,134,675.     October 25, 1938.

JACOB L. SHROYER.

It is hereby certified that error appears in the printed specification of the above numbered patent requiring correction as follows: Page 2, first column, line 13, for the word "above" read about; and that the said Letters Patent should be read with this correction therein that the same may conform to the record of the case in the Patent Office.

Signed and sealed this 13th day of December, A. D. 1938.

Henry Van Arsdale (Seal)     Acting Commissioner of Patents.